United States Patent [19]

Simpson et al.

[11] 3,864,566
[45] Feb. 4, 1975

[54] OPTICAL SYSTEMS AND ASSOCIATED DETECTING MEANS

[75] Inventors: George R. Simpson, South Woodstock; Stephen M. MacNeille, Thompson, both of Conn.

[73] Assignee: American Optical Company, Southbridge, Mass.

[22] Filed: Sept. 18, 1957

[21] Appl. No.: 685,062

[52] U.S. Cl................ 250/216, 102/70.2, 250/203, 250/239, 250/342, 250/578, 356/4
[51] Int. Cl................................................. H04j 3/14
[58] Field of Search............... 88/1, 14, 78, 74, 1 M; 102/70.2; 250/216, 220, 203, 239, 342, 578; 356/4

[56] References Cited
UNITED STATES PATENTS

| 705,771 | 7/1902 | Lumiere | 353/82 |
|---|---|---|---|
| 2,137,598 | 11/1938 | Vos | 102/70.2 P |
| 2,369,622 | 2/1945 | Toulon | 250/350 |
| 2,892,093 | 6/1959 | Henderson | 102/70.2 X |

FOREIGN PATENTS OR APPLICATIONS

| 352,035 | 6/1931 | Great Britain |
|---|---|---|
| 585,792 | 2/1947 | Great Britain |
| 1,042,722 | 6/1953 | France |

*Primary Examiner*—Samuel Feinberg
*Assistant Examiner*—H. J. Tudor
*Attorney, Agent, or Firm*—H. R. Berkenstock, Jr.; William C. Nealon

EXEMPLARY CLAIM

1. An opaque main supporting housing and a said light-collecting and detecting system disposed within said main supporting housing at a location intermediate the spaced opposite ends thereof said housing surrounding said light-collecting and detecting system and said system being arranged to simultaneously view from said location all parts of a predetermined endless annular object field outwardly of said main housing and in concentric relation to a longitudinal axis extending centrally through said housing, said system comprising a single photosensitive detecting element of relatively small predetermined size disposed at a fixed axial location in said main housing for detecting any appreciable change in light intensity occurring in any part of said object field, a plurality of similar light apertures circumferentially arranged in side wall portions of said housing, said light apertures being appreciably spaced from one another in said wall portions and with said wall portions between each pair of adjacent light apertures being of substantially equal size, each of said light apertures being of relatively small dimensions considered in both the axial and circumferential directions of said housing, and each being arranged in like angular relation to said longitudinal axis at said fixed axial location, whereby each of said light apertures will be disposed so as to face outwardy toward a different predetermined sector of said endless angular object field, each light aperture being formed so as to view a sector of appreciable circumferential angular value, and to admit into said housing light from all parts of the sector aligned therewith, and all of said light apertures being so disposed relative to each other in said housing as to jointly simultaneously admit into said housing light from all parts of said endless annular object field, a plurality of optical systems within said housing, each of said optical systems being optically aligned with a different one of said light apertures, respectively, and with said photosensitive detecting element, and each of said optical systems comprising means providing a plurality of spaced optical surfaces including means having an optical surface for collecting substantially all of the light from said object field which enters the light aperture aligned therewith and for directing substantially all of the light so collected toward means providing a second optical surface, said second optical surface being a positive optical surface disposed so as to receive substantially all of said light and direct same as a convergent beam onto said photosensitive detecting element.

7 Claims, 11 Drawing Figures

PATENTED FEB 4 1975　3,864,566
SHEET 1 OF 2

INVENTORS
GEORGE R. SIMPSON
STEPHEN M. MacNEILLE
BY Louis L. Gagnon
Noble S. Williams
ATTORNEYS

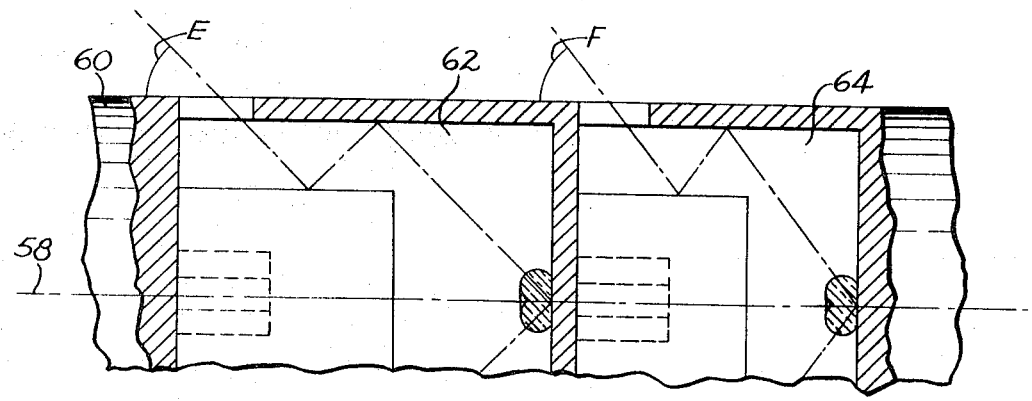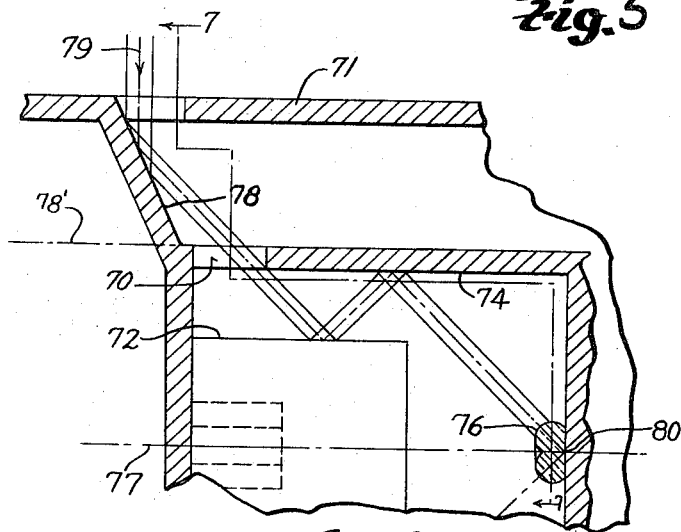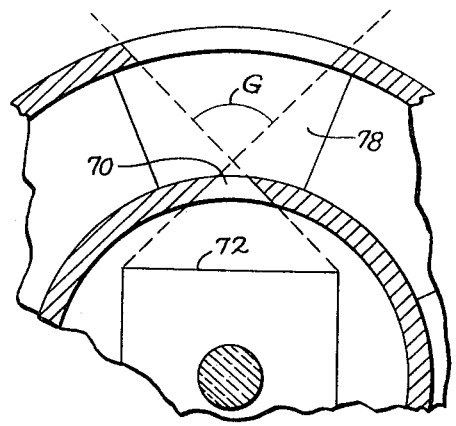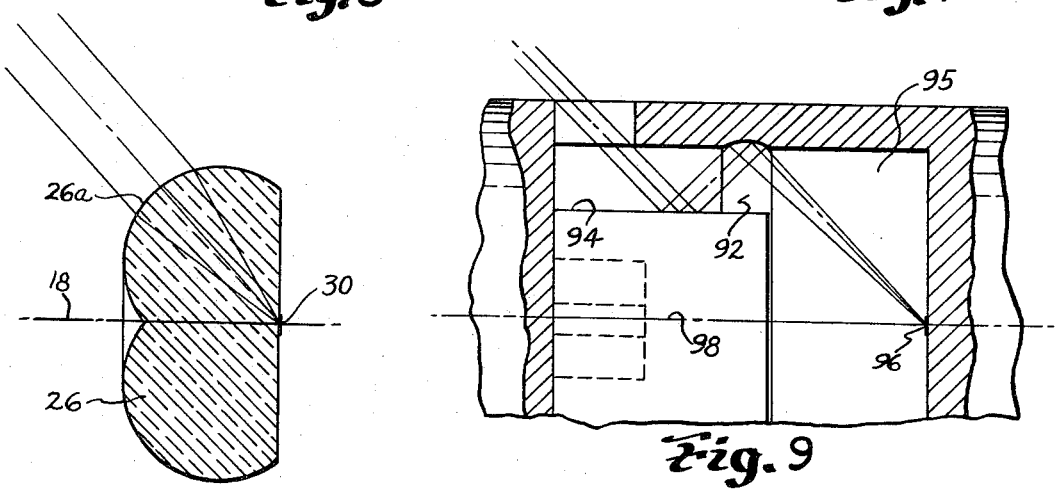

OPTICAL SYSTEMS AND ASSOCIATED DETECTING MEANS

IMPROVEMENTS IN OPTICAL SYSTEMS AND ASSOCIATED DETECTING MEANS

This invention relates to a combined optical system and associated detecting means. More particularly, the invention relates to a circumferential viewing system comprising a plurality of similar optical systems positioned within a main supporting housing or body and arranged to simultaneously "view," through a like number of relatively small light apertures peripherally arranged in wall portions of said housing, an endless annular object field surrounding said housing, or surrounding a preselected axis extending outwardly from said housing; said similar optical systems being constructed and arranged to function in closely nested relation to each other and simultaneously focus said light apertures upon a single suitable radiant energy detector in such a manner that any material change in light coming from any location in said object field and entering an aperture in said housing will be sensed or looked at by said detector. (When the word "light" appears in the description which follows, it is used in its broad sense and is intended to include not only visible light but infra-red and ultra-violet as well).

In certain instances, it is highly desirable to be able to detect changes in radiation as they occur at any location or azimuth angle within a predetermined 360° annular object field surrounding a housing, or surrounding a certain axis extending outwardly therefrom; and heretofore in one prior construction means for such a purpose has been employed at one end of a main supporting housing in order that a clear unobstructed view of all parts of such an annular object field may be had and radiation changes therein detected. However, for reasons not specified at this time, it has been necessary in a number of instances to utilize the space at the end or ends of such a main supporting housing for other purposes and accordingly desirable to locate any such optical viewing and detecting means for the above-mentioned purposes in side wall portions of the main housing removed from both ends thereof.

Of course, such a circumferential viewing system and detecting means should, nevertheless, be able to simultaneously view or sense all parts of the surrounding object field without having any "blind spots" present therein; and one proposal has been to provide a 360° transparent window in the side wall portions of the main housing. This, it will be readily appreciated, is not at all practical in cases wherein the main housing is required to have an appreciable amount of structural strength for holding the parts of the body at opposite sides of such a window together. Also, it will be appreciated, that it is not feasible for such an arrangement to merely additionally provide a plurality of structural members to bridge the gap so formed since these members would create "blind spots" in the annular object field.

It has also been proposed heretofore to provide for such a 360° viewing and detecting structure a plurality of separate optical systems arranged at spaced locations in side wall portions of a main housing with same arranged to view adjoining sectors of the annular field and each provided with a separate radiant energy detector. A major factor experienced in connection with this prior arrangement was that not only were the several associated detectors difficult and expensive to make so as to have substantially identical optical and photo-electric response characteristics but also a complete balancing of these detectors in a way to function together in a sensitive electronic response system coupled therewith could not always be obtained and maintained.

The improved structure of the present invention, however, is of such construction and arangement that not only may a plurality of light apertures by provided at peripherally spaced locations in side wall portions of a main supporting housing or the like and arranged to function with a plurality of similar optical systems aligned therewith in such a way as to simultaneously view or sense all parts of a substantially flat endless annular object field surrounding said main housing, or all parts of a hollow conically shaped endless annular object field surrounding a predetermined axis extending outwardly from said main housing, but also these several optical systems are disposed in such closely nested relation to each other that each is simultaneously focused upon a common image area and a single radiant energy detecting element used at this common focal point for detecting changes in radiation in any part of said object field; said improved structure having the distinct advantage that only a few light apertures of small size, considered both longitudinally and circumquentially, will be required in the side wall portions of said main housing.

It is accordingly an object of the present invention to provide in side wall portions of a main supporting housing, or the like, a plurality of peripherally spaced small light apertures and a plurality of optical systems associated therewith in such a manner as to simultaneously and jointly optically view or examine all parts of an endless annular object field surrounding said housing, or surrounding an axis extending centrally through and outwardly from said housing, as well as a single small photosensitive detecting element operatively associated therewith; said optical systems being constructed and arranged to fit or nest closely together and simultaneously focus the several light apertures upon a common image area, and said single detecting element being located at said image area and arranged to respond to any appreciable change in radiation falling thereon from any point within said annular object field.

It is an additional object of the invention to provide optical and radiant energy detecting means of the character described which employs a plurality of refracting optical systems for effecting said simultaneous 360° viewing or examining of said annular object field and to detect any changes in radiation therein.

It is also an object of the invention to provide optical and radiant energy detecting means of the character described which employ a plurality of reflecting optical means for effecting said simultaneous 360° viewing or examining of said endless annular object field and to detect any appreciable change in radiation occurring therein.

It is an additional object of the invention to provide within said housing an optical viewing and detecting system comprising a plurality of combined refracting and reflecting optical systems so related to each other as to provide a complete and simultaneous viewing of all parts of said endless annular object field and to detect any changes in radiation therein by means of a single radiant energy detector.

It is also an object of the invention to provide within said housing an optical viewing and detecting system comprising a plurality of optical systems free from absorptive refractive components and so related to each other as to provide a complete and simultaneous viewing of all parts of said endless annular object field and to detect any radiant energy changes therein by means of a single small detecting element.

It is another object of the invention to provide in an optical viewing and detecting system of the character described additional means whereby the annular object field being viewed or examined may be in any angular relation desired relative to said housing or relative to a preselected axis extending outwardly from said main housing.

It is also an object of the invention to provide optical and radiant energy detecting means of the character described comprising means whereby two differently angularly related endless annular object fields may be simultaneously examined and means whereby each will separately sense radiation changes therein.

Other objects and advantages of the invention will become apparent from the detailed description which follows when taken in conjunction with the accompanying drawings, in which:

FIG. 5 is a fragmentary longitudinal sectional view showing a modified form of the invention comprising dual optical and photo-electric detecting means which may be used for simultaneous viewing of two annular object fields;

FIG. 6 is a fragmentary longitudinal sectional view showing another modified form of the invention;

FIG. 7 is a fragmentary sectional view taken substantially upon section line 7—7 of FIG. 6 and looking in the direction of the arrows;

FIG. 8 is a fragmentary sectional view taken substantially upon section line 8—8 of FIG. 2;

FIG. 9 is a sectional view of a modified form of optical and detecting means which may be used in carrying out the present invention;

Figure 1:
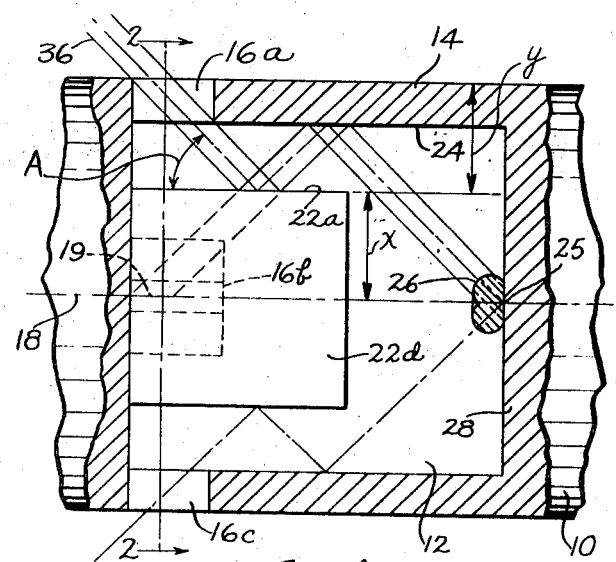
FIG. 1 is a diagrammatic longitudinal sectional view of a main supporting housing or body embodying the present invention, said view being taken substantially upon a longitudinal central axis thereof and showing optical components and photo-electric detecting means associated therewith.

Referring to the drawings in detail, it will be seen that in FIG. 1 an elongated cylindrically-shaped main supporting housing or body of a vehicle, missile or the like is generally indicated by the numeral 10 and located within this housing at a location intermediate its opposite end is a chamber 12 surrounded by side wall portions 14 of said body. In the side wall portions 14 is located a plurality of light apertures or slots of relatively small size, considered both longitudinally and circumferentially, for simultaneously admitting light from all parts of an external endless annular object field or endless annular zone of view, and it will be seen from inspection of FIG. 2 that in the present instance four such light apertures 16a, 16b, 16c, and 16d are sufficient for this purpose and are shown appreciably circumferentially spaced from one another in said wall portions and with the wall portions between each pair of adjacent light apertures being of substantially equal size so that each light aperture will look at a different sector $b$ of said endless annular object field and each will cover a sector of substantially 90°. These light apertures are also equally radially spaced from a central longitudinal axis 18 of said main supporting housing 10 and form a common axial point 25 thereon. While four apertures have been shown, it will be clear from the description which follows that the number is not critical as long as three or more are used and are properly spaced so as to collectively completely view the 360° endless annular object field without materially structurally weakening said main supporting housing. From a practical standpoint, however, ordinarily four, five, or six will be preferred.

Each light aperture, such as 16a, even though small, is relatively long in comparison to its width and extends, as shown in FIG. 1, in a direction parallel to the central axis 18 of housing 12. The length of each aperture is not critical but, of course, should be sufficient to allow a substantially parallel beam of light, like beam 36, of adequate size from a distant object to illuminate the detector (presently to be described) within the housing. The transverse size and shape of each light aperture and the opening in the wall portions 14 adjacent thereto will be dealt with more fully hereinafter. Within chamber 12 and disposed so as to face radially outwardly and be in line with light from the endless annular object field entering the chamber through said apertures at a predetermined sensing or look angle A relative to axis 18, is a plurality of plane mirrors or plane specularly reflecting surfaces 22a, 22b, 22c, and 22d; and each of these plane mirrors or reflecting surfaces is carefully formed and disposed as shown by mirror 22a in FIG. 1 and 2, so as to lie in a plane parallel to the central axis 18 while also being disposed (as indicated by the dimensions $x$ and $y$, which are equal, in FIG. 1) half-way between the narrowest part of the opening in side wall portions 14 associated therewith and the longitudinal axis 18. This narrowest part of the opening, in effect, forms the light aperture 16a for admitting light beams of sufficient size, such as beam 36 into the housing for energizing the photosensitized detector therein. Thus, each plane mirror or reflector will form a virtual image of the particular light aperture associated therewith in a plane coincident with central axis 18 as indicated at 19.

The cylindrical interior surface 24 of said wall portions 14 of chamber 12 is preferably accurately formed and finished so as to reflect light received thereby and is of circular cross section in concentric relation with axis 18. Thus since the virtual images of the four light apertures are in substantial coincidence at the axial location 19, the mirror-like cylindrical surface 24 will form four real images of these virtual images of light apertures 16a–16d at unit magnification substantially at the axial location indicated by numeral 25. It will be seen that a bundle of light rays 36 has been indicated in FIG. 1 obliquely entering one of said light apertures 16a and as being reflected obliquely by the plane reflecting surface 22a aligned therewith toward surface 24. As also indicated in FIG. 1, this bundle will thereafter be reflected by cylindrical surface 24 generally towards the preselected axial location 25. However, from inspection of FIG. 2, it will be seen that while an angular field or sector of 90° has been indicated at B adjacent aperture 16a, the bundle 36 has been indicated as light coming from a location within this object field sector and entering the aperture obliquely. Obviously, parts of the wall portions 14 adjacent light aperture 16a have been cut back or removed sufficiently so as not to intercept any of this light from sector B which passes into the housing 12 through light aperture 16a.

It will be seen that this small bundle of light rays, (which may be considered representative of any selected small bundle within the angular field B), after passing through aperture 16a, will impinge upon the plane mirror surface 22a in a sloping direction indicated by angle C. Nevertheless, each way of the bundle of rays (which rays are substantially parallel to one another) will be thereafter reflected by surface 22a at an angle of reflection equal to the angle of incidence. Thus, while the central rays of the bundle are reflected outwardly in a radial plane 38 and will be thereafter reflected back in this radial plane 38 toward axis 18, nevetheless, the outermost light rays of the bundle will be converged when reflected by the surface 24 so as to cross each other substantially half-way between surface 24 and axis 18.

Figure 2:
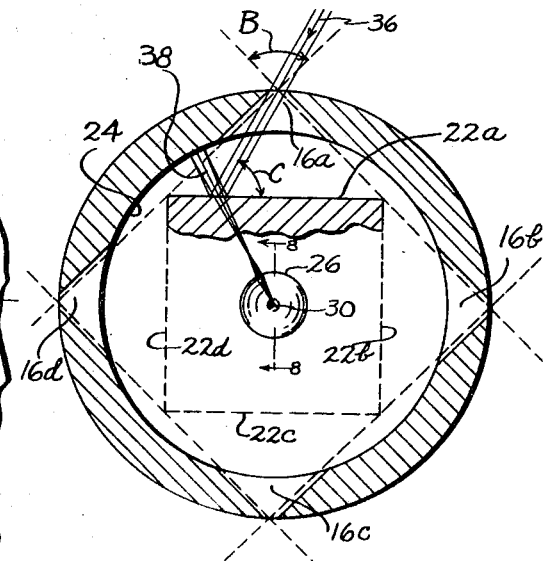
FIG. 2 is a cross-sectional view taken substantially upon section line 2—2 of FIG. 1, and looking in the direction of the arrows.

Substantially at the axial location 25 is located a relatively small radiant detecting element 30 (see FIG. 8) and in order to concentrate light rays, such as the bundle 36, to be received thereby, there is provided a refracting element 26. The refracting element 26, as clearly indicated in FIG. 2, is a figure of revolution having an annular refracting surface which is of such a shape that when any radial plane extending from the axis 18 is considered, such as in FIGS. 1 and 8, there will be disclosed a refracting surface 26a of such controlled curvature as to tend to refract the light rays impinging thereon toward detecting element 30. On the other hand, when the refracting element 26 is considered in the transverse direction shown in FIG. 2, it will be evident that the annular curvature of the surface 26a will also tend to cause the light rays of bundle 36 to be refracted inwardly toward the small centrally disposed detecting element 30.

Since four separate similar reflecting and refracting systems are provided each covering a 90° field of view and the positive refracting element or component 26 serves to combine same into a composite system for directing all light received thereby onto the single detector 30, it should be clear that all parts of a 360° object field of hollow conical shape will be viewed simultaneously by the combined system. Since the refracting element 26 and the plane reflecting surfaces 22a-22d and cylindrical surface 24 are so related to each other that an image of the small detecting element 30 will be formed substantially at each light aperture 16a-16d, in theory each aperture need be no wider than the width of the detecting element image formed adjacent each light aperture. In practice, however, an aperture of twice this width might be preferred. Nevertheless, it would still be of narrow width.

In the construction used in FIG. 1, the material forming the refracting element or component 26 employed for concentrating the light rays impinging thereon should be selected with care in accordance with the particular type of radiation to be "viewed" by the system. Also, the material forming the radiant energy detector 30 would be selected in accordance with the type of radiation to be detected. For example, while a suitable crown or flint glass or an equivalent glass or colorless transparent plastic medium might be employed in the formation of the refracting element 26 if only radiation in a visible region of the spectrum is to be detected, on the other hand, if, for example infrared radiation is of particular interest, it might be that a different material, an infra-red transmitting plastic or glass would be required for forming the refracting element. Also of importance is the refractive index of the element, a high index being preferable, since when the detecting material 30 is deposited so as to be in optical contact with the refractive element 26 a numerical aperture as high as the refractive index of the refracting element 26 may be obtained.

Figure 3:
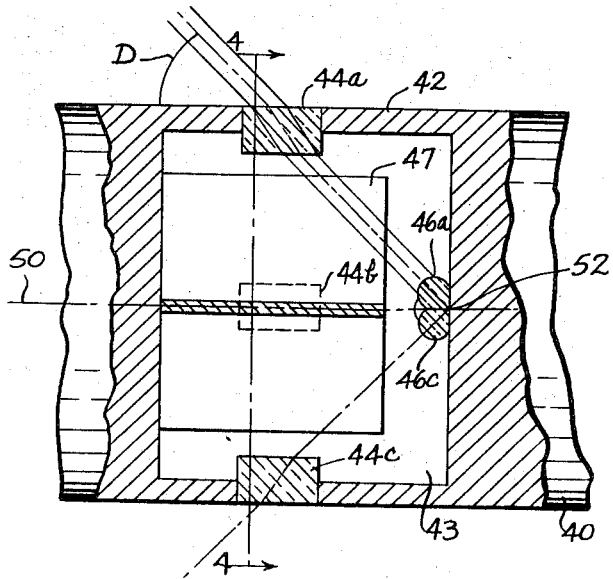
FIG. 3 is a diagrammatic longitudinal view similar to that of FIG. 1 but showing a modified form of the invention.
Figure 4:
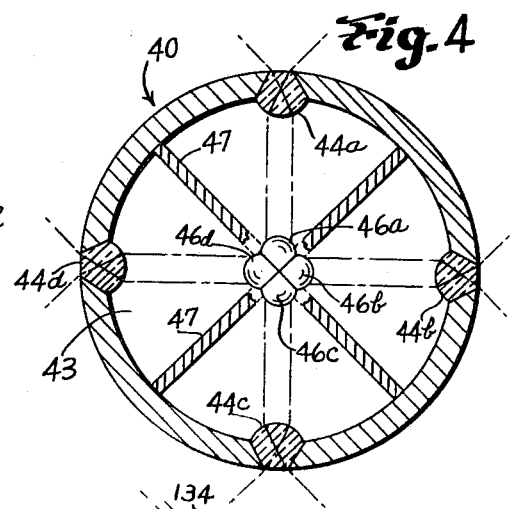
FIG. 4 is a cross-sectional view taken substantially upon section line 4—4 of FIG. 3 and looking in the direction of the arrows.

In FIGS. 3 and 4, is shown a modified form of annular viewing and detecting system which may be used for a similar purpose. From this modification it will be readily appreciated that instead of employing combinations of reflecting and refracting elements or components for the separate parts of the combined optical system, as in FIG. 1; this modified construction employs, at equally spaced peripheral locations in an outer side wall 42 of a main housing 40 a plurality of light apertures having a plurality of elongated refracting convergent elements or components 44a, 44b, 44c, 44d, positioned therein with their longer dimension parallel to axis 50. Preferably, such an elongated element would be plane on its outer surface and suitably curved on its inner surface so as to refract the light entering the aperture from a 90° field and at a sloping angle D, as shown in FIG. 4.

Arranged within a chamber 43 to function with these elements are a plurality of centrally located convergent refracting optical elements of components 46a, 46b, 46c, and 46d. Each pair of inner and outer optical elements or components, for example, 44a and 46a, is of such optical design that the outer element (see 44a) will view a 90° sector of the annular object field disposed at the sloping angle D relative to central axis 50 and will refract the light so received into a parallel beam directed toward the inner element (46a) disposed adjacent central axis 50. Thus, the four similar pairs of refracting components together will completely cover a conically shaped hollow annular object field which is in concentric relation with the longitudinal axis 50. Of course, this viewing system may be arranged, as may also that of FIG. 1, to face either in a forward or rearward direction, as desired.

The four inner refracting components 46a – 46d are arranged as shown in FIGS. 3 and 4 to nest closely together so as to focus their parallel beams of light substantially at a common small image area. The four components may be cemented together in known manner along adjacent surfaces to form a unitary cluster free from reflective interfaces, or alternatively might be simultaneously formed as a single unit by a single molding or casting operation; the end purpose in either case being to provide a common image area about the common axial point 52 at which a single small radiant energy detecting element may be located; it being desirable in this modification as in that of FIG. 1 to provide good optical contact between this detecting means and the refracting material of the cluster so that a high numerical aperture will be obtained.

In FIGS. 3 and 4, as in the previously described modification, the four individual optical systems are disposed intermediate the ends of the main supporting housing but, nevertheless, combine in concentrating the radiation from any part of an annular object field onto the detector located at axial location 52. In order that no radiant energy from an undesired direction may enter the chamber 43 and be reflected from interior wall portions thereof and improperly excite the detecting means, a pair of cross baffles 47 may be used and treated with a light-absorbing paint or the like. In fact, if desired, the entire interior of chamber 43 could be so treated for light absorption.

It may be at times desirable to provide a second, or even a third, annular viewing system to simultaneously cover two or three object fields differently angularly related to the main supporting body. One manner of accomplishing such an arrangement is shown in FIG. 5. In this figure, a first annular viewing and detecting system like that shown in FIG. 1 is contained within a first chamber 62 in a main housing 60 and a second similar annular viewing and detecting system is contained within a second chamber 64 therein. (Obviously, either system could be, if desired, patterned after the modified system of FIG. 3). A material difference between the systems in chambers 62 and 64, it will be seen, resides in the fact that the individual optical components thereof are differently longitudinally disposed in said housing so that different conically shaped object fields will be viewed. For example, while the first optical system bears a predetermined angular value of E to the central axis 58, said second optical system bears a different predetermined angular value of F relative thereto. Thus, if the housing 60 is travelling in the direction of axis 58 and this travel causes an object spaced from the axis 58 to pass through the conical field established by the viewing system within chamber 62 (and arranged, for example, at a 50° angular value relative to the axis 58), and then causes the object to pass through the second conical field established by the viewing system in chamber 64 (and having, for example, an angular value of 60° relative to axis 58), these two conical fields would be intercepted by the object at different moments. Accordingly, the detecting means associated with the two systems within chambers 62 and 64 would detect such interruptions at spaced intervals, and this information might be recorded or otherwise used by suitable electronic equipment operatively associated with said detecting means.

While the optical systems of FIGS. 1, 3 and 5 are arranged to view hollow conically shaped annular object fields surrounding the longitudinal central axes of the main supporting housings, it may be at times desirable to be able to view and detect changes in a substantially flat transversely disposed annular object field circumferentially surrounding the main housing, as distinguished from a conically shaped object field, and such may be accomplished by the addition of a plurality of mirrors as shown by the construction of FIGS. 6 and 7. While light aperture 70, plane reflecting surface 72, cylindrical reflecting surface 74 and refracting component 76 may be substantially identical to corresponding parts shown in FIG. 1, it may be desirable to additionally provide, outwardly of each light aperture 70, a conically shaped angularly disposed reflecting surface or mirror 78. Each conically shaped mirror 78 would not only cover a 90° sector of the annular field, as indicated at G in FIG. 7, but also would admit only light approaching the housing 71 substantially at a 90° angle relative to central axis 77 as indicated by arrow 79. While the slope of the conical surface 78 is shown in FIG. 6, it should also be noted that this conical surface would be generated about an axis 78' which is parallel to central axis 77 and which lies in the plane of and bisects the light aperture 70. Each conical reflecting surface 78 thus is such that only light coming from parts of a 90° sector of a circumferential field surrounding the main housing 71 and at right angles to the longitudinal central axis 77 may reach the detector indicated at 80. Nevertheless, when four systems are used, an endless annular object field circumferentially related to the housing 71 may be viewed by this viewing and detecting system.

In connection with the axially disposed refracting component of FIGS. 1, 3, 5, 6 and 8, it should be pointed out that the photosensitive detecting material 30, or the like, used for radiant energy detection should be immersed in the transparent refracting material or so bonded thereto as to be in good optical contact therewith. When such is the case, each separate optical system of optical components disclosed herein can be made to have a numerical aperture substantially equal to the refractive index of the immersing material; while having radiant energy from $2\pi$ steradians fall upon the photosensitive material.

In FIG. 9, a slightly different form of annular optical systems is shown. While this system is somewhat like that of FIG. 1 and employs a plurality of light apertures and plane mirrors aligned therewith, nevertheless, no refracting component or components are used or required; and at times such might be desirable such as for detecting certain radiations notwithstanding the fact that a somewhat slower system would result. Only reflecting surfaces are employed and thus radiant energy absorption due to transmission characteristics of refracting materials would be avoided. In this modification a concave longitudinal curvature carefully controlled shape (preferably parabolic) is provided at 92 upon the cylindrical interior surface of the chamber 95 so that the substantially parallel light received from plane surfaces (such as surface 94) will be focused by the surface 92 upon the detector 96 at central axis 98.

Figure 10:
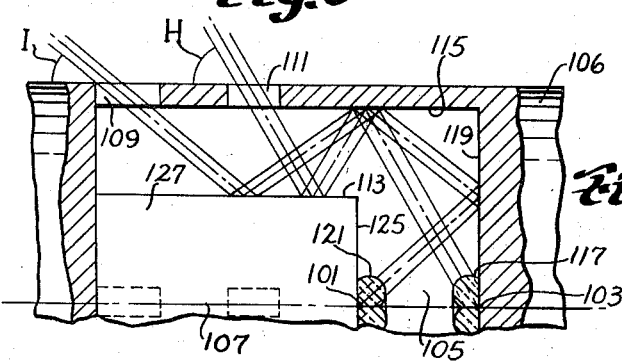
FIG. 10 is a longitudinal sectional view somewhat like FIG. 5 but showing a modified form of dual viewing and detecting means.

A modified form of dual annular viewing and detecting system is shown in FIG. 10, and this system differs from the dual system shown in FIG. 5 in that the two separate detectors 101 and 103 thereof are employed within a single chamber 105 in the main housing 106. One advantage of such an arrangement over that shown in FIG. 5 resides in the fact that less space within the main housing 106 will be required.

In this modification detectors 101 and 103 are arranged at spaced locations upon a longitudinal central axis 107 and two longitudinally spaced sets of peripherally disposed light apertures 109 and 111 are arranged to function therewith. These apertures, it will be noted, are so located in outer wall portions of the housing 106 that when light is admitted at an angular value of H through any one of the light apertures 111 it will be reflected by the associated plane surface 113 and then by the cylindrical surface 115 in such a direction as to fall upon the refracting component 117 associated with detector 103. On the other hand, when light is admitted through any one of the apertures 109 at an angular value of I, it will be likewise reflected by one of the plane surfaces 113 and by the cylindrical surface 115, but thereafter it will be "folded back" by the plane vertical reflecting surface 119 so as to impinge upon the refracting component 121 associated with detector 101. Detector 101 for convenience has been shown in this figure disposed upon a vertical end wall or surface 125 of a block 127 upon which the plane reflecting surfaces 113 are also disposed.

Figure 11:
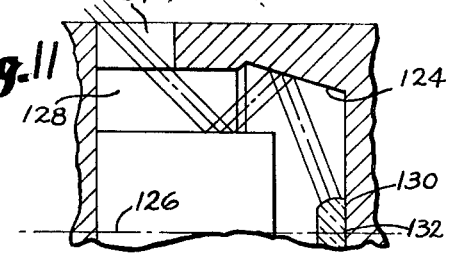
FIG. 11 is a fragmentary longitudinal sectional view of a modified form of the invention.

In FIG. 11 is shown a further modification of the invention. In the construction shown therein, it will be seen that in place of a cylindrical reflecting surface like that at 24 in FIG. 1, there is employed a forwardly facing annular conically shaped interior reflecting surface 124. While such a surface will function like surface 24 in converging the reflected light toward the axis 126, a distinct additional advantage to be derived from the use of same would be a foreshortening of the overall length of the chamber 128 housing the associated optical components. Of course, the associated annular refracting element 130 would have to be of a slightly altered optical design to efficiently direct the light refracted thereby onto the detecting element 132. It is noted that a slight change in detector image magnification at the light aperture 134 would be effected by use of this modified construction.

Referring again to the constructions shown in FIG. 1 and in FIG. 9, it should be readily apparent to one versed in optical designs, that part of the desired longitudinal convergence of the light beam energizing the associated photosensitive detector can be provided by a concavely curved annular reflecting surface like surface 92 and part by a convergent refracting element like element 26. However, when efficiency and simplicity of optical design and ease and cost of manufacture are considered, generally a structure of the type disclosed in FIG. 1 will be preferred over that of FIGS. 3, 9 or 11.

Having described the invention, we claim:

1. An opaque main supporting housing and a light-collecting and detecting system disposed within said main supporting housing at a location intermediate the spaced opposite ends thereof said housing surrounding said light-collecting and detecting system and said system being arranged to simultaneously view from said location all parts of a predetermined endless annular object field outwardly of said main housing and in concentric relation to a longitudinal axis extending centrally through said housing, said system comprising a single photosensitive detecting element of relatively small predetermined size disposed at a fixed axial location in said main housing for detecting any appreciable change in light intensity occurring in any part of said object field, a plurality of similar light apertures circumferentially arranged in side wall portions of said housing, said light apertures being appreciably spaced from one another in said wall portions and with said wall portions between each pair of adjacent light apertures being of substantially equal size, each of said light apertures being of relatively small dimensions considered in both the axial and circumferential directions of said housing, and each being arranged in like angular relation to said longitudinal axis at said fixed axial location, thereby each of said light apertures will be disposed so as to face outwardly toward a different predetermined sector of said endless annular object field, each light aperture being formed so as to view a sector of appreciable circumferential angular value, and to admit into said housing light from all parts of the sector aligned therewith, and all of said light apertures being so disposed relative to each other in said housing as to jointly simultaneously admit into said housing light from all parts of said endless annular object field, a plurality of optical systems within said housing, each of said optical systems being optically aligned with a different one of said light apertures, respectively, and with said photosensitive detecting element, and each of said optical systems comprising means providing a plurality of spaced optical surfaces including means having an optical surface for collecting substantially all of the light from said object field which enters the light aperture aligned therewith and for directing substantially all of the light so collected toward means providing a second optical surface, said second optical surface being a positive optical surface disposed so as to receive substantially all of said light and direct same as a convergent beam onto said photosensitive detecting element.

2. An opaque main supporting housing and a light-collecting and detecting system disposed within said main supporting housing at a location intermediate the spaced opposite ends thereof said housing surrounding said light-collecting and detecting system and said system being arranged to simultaneously view from said location all parts of a predetermined hollow conically-shaped endless annular object field outwardly of said main housing and in concentric relation to a longitudinal axis extending centrally through said housing, said system comprising a single photosensitive detecting element of relatively small predetermined size disposed at a fixed axial location in said main housing for detecting any appreciable change in light intensity occurring in any part of said object field, a plurality of similar light apertures circumferentially arranged in wall portions of said housing, said light apertures being appreciably spaced from one another in said wall portions and with said wall portions between each pair of adjacent light apertures being of substantially equal size, each of said light apertures being of relatively small dimensions considered in both the axial and circumferential directions of said housing, and each being arranged in like angular relation to said longitudinal axis at said fixed axial location, whereby each of said light apertures will be disposed so as to face outwardly toward a different predetermined sector of said conically-shaped endless annular object field, each light aperture being formed so as to view a sector of appreciable circumferential angular value, and to admit into said housing light from all parts of the sector aligned therewith, and all of said light apertures being so disposed relative to each other in said housing as to jointly simultaneously admit into said housing light from all parts of said conically-shaped endless annular object field, a plurality of optical systems within said housing each of said optical systems being optically aligned with a different one of said light apertures, respectively, and with said photosensitive detecting element, and each of said optical systems comprising means providing a plurality of spaced optical surfaces including means having an optical surface for collecting substantially all of the light from said object field which enters the light aperture aligned therewith and for directing substantially all of the light so collected toward means providing a second optical surface, said second optical surface being a positive optical surface disposed so as to receive substantially all of said light and direct same as a convergent beam onto said photosensitive detecting element.

3. The combination as set forth in claim 2 and in which the first-mentioned optical surface of each optical system is a plane mirror surface disposed substantially half-way between the plane of the light aperture aligned therewith and said axis and is substantially parallel to said axis so as to form a virtual image of this light aperture substantially at said longitudinal axis of said housing, and said second surface is a cylindrical surface in concentric relation to said longitudinal axis.

4. The combination as set forth in claim 2 and in which the first-mentioned optical surface of each optical system is a cylindrically curved refracting surface formed upon a refracting optical component disposed adjacent the outer surface of said housing, said cylindrical surface having its axis of curvature extending in a direction parallel to said longitudinal axis, and said second surface is a spherically curved surface disposed adjacent said photosensitive detecting element.

5. The combination as set forth in claim 2 and in which the first-mentioned optical surface of each optical system is a plane mirror surface disposed substantially half-way between the plane of the light aperture aligned therewith and said longitudinal axis and is substantially parallel to said axis so as to form a virtual image of this light aperture substantially at said longitudinal axis, and said second surface is a conically-shaped surface having its axis in concentric relation to said longitudinal axis and having an apex angle such as to direct light received from said first surface generally toward said photosensitive detecting element.

6. The combination as set forth in claim 2 and in which the first-mentioned optical surface of each optical system is a plane mirror surface disposed substantially half-way between the plane of the light aperture aligned therewith and said longitudinal axis and is substantially parallel to said axis so as to form a virtual image of this light aperture substantially at said longitudinal axis, and said second surface is a toric surface having one of its surface curvatures in concentric relation to said longitudinal axis and its other surface curvature of such positive power as to focus parallel light from said first surface upon said photosensitive detector.

7. An opaque main supporting housing and a light-collecting and detecting system disposed within said main supporting housing at a location intermediate the spaced opposite ends thereof said housing surrounding said light-collecting and detecting system and said system being arranged to simultaneously view from said location all parts of a predetermined hollow conically-shaped endless annular object field outwardly of said main housing and in concentric relation to a longitudinal axis extending centrally through said housing, said system comprising a single photosensitive detecting element of relatively small predetermined size disposed at a fixed axial location in said main housing for detecting any appreciable change in light intensity occurring in any part of said object field, a plurality of similar light apertures circumferentially arranged in wall portions of said housing, said light apertures being appreciably spaced from one another in said wall portions and with said wall portions between each pair of adjacent light apertures being of substantially equal size, each of said light apertures being of relatively small dimensions considered in both the axial and circumferential directions of said housing, and each being arranged in like angular relation to said longitudinal axis at said fixed axial location, whereby each of said light apertures will be disposed so as to face outwardly toward a different predetermined sector of said conically-shaped endless annular object field, each light aperture being formed so as to view a sector of appreciable circumferential angular value, and to admit into said housing light from all parts of the sector aligned therewith, and all of said light apertures being so disposed relative to each other in said housing as to jointly simultaneously admit into said housing light from all parts of said conically-shaped endless annular object field, a plurality of optical systems within said housing, each of said optical systems being optically aligned with a different one of said light apertures, respectively, and with said photosensitive detecting element, and each of said optical systems comprising means providing a plurality of spaced optical surfaces including means having a plane mirror surface for collecting substantially all of the light from said object field which enters the light aperture aligned therewith and for reflecting substantially all of the light so collected toward means providing a second optical surface, said second optical surface being a cylindrically curved mirror surface disposed in concentric relation to said longitudinal axis so as to receive substantially all of the reflected light and direct same toward a third optical surface, and said third optical surface being a positive refracting surface disposed on a refractive component having said photosensitive element in optical contact with an opposed surface thereon, said third surface serving to direct substantially all of the light so received as a convergent beam onto said photosensitive detecting element.

* * * * *